US011327607B1

(12) United States Patent
Lin et al.

(10) Patent No.: US 11,327,607 B1
(45) Date of Patent: May 10, 2022

(54) TOUCH DETECTION CIRCUIT AND TOUCH DETECTION METHOD THEREOF

(71) Applicant: Novatek Microelectronics Corp., Hsinchu (TW)

(72) Inventors: Yi-Cheng Lin, New Taipei (TW); Che-Chia Hsu, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/398,000

(22) Filed: Aug. 10, 2021

(51) Int. Cl.
*G06F 3/041* (2006.01)
*G06F 3/044* (2006.01)

(52) U.S. Cl.
CPC .......... *G06F 3/04186* (2019.05); *G06F 3/044* (2013.01); *G06F 3/04166* (2019.05)

(58) Field of Classification Search
CPC ... G06F 3/04166; G06F 3/04186; G06F 3/044
See application file for complete search history.

(56) References Cited

U.S. PATENT DOCUMENTS

| 10,254,896 | B2* | 4/2019 | Mori | G06F 3/04182 |
| 10,365,764 | B2* | 7/2019 | Korapati | G06F 3/041662 |
| 11,157,109 | B1* | 10/2021 | Shorten | G06F 3/04166 |
| 2008/0158146 | A1* | 7/2008 | Westerman | G06T 7/41 |
| | | | | 382/209 |
| 2012/0062474 | A1* | 3/2012 | Weishaupt | G06F 3/04883 |
| | | | | 345/173 |
| 2013/0176268 | A1* | 7/2013 | Li | G06F 3/04186 |
| | | | | 345/174 |
| 2014/0035868 | A1* | 2/2014 | Yasue | G06F 3/04186 |
| | | | | 345/174 |
| 2016/0253041 | A1* | 9/2016 | Park | G06F 3/0443 |
| | | | | 345/174 |
| 2017/0052625 | A1* | 2/2017 | Bryant | G06F 3/04883 |
| 2017/0269729 | A1* | 9/2017 | Chintalapoodi | G01N 27/223 |
| 2017/0277328 | A1* | 9/2017 | Kurasawa | G06F 3/04164 |
| 2018/0307375 | A1* | 10/2018 | Shah | G06V 40/28 |
| 2022/0011920 | A1* | 1/2022 | Shorten | G06F 3/044 |

FOREIGN PATENT DOCUMENTS

| WO | WO-2008085404 A2 * | 7/2008 | G06F 3/0304 |
| WO | WO-2012176639 A1 * | 12/2012 | G06F 3/041 |

* cited by examiner

*Primary Examiner* — Michael Pervan
(74) *Attorney, Agent, or Firm* — JCIPRNET

(57) ABSTRACT

A touch detection circuit and a touch detection method are provided. The touch circuit coupled to touch areas of touch panel includes a touch controller and a detection circuit. The touch controller performs a touch detection on the touch areas sequentially. The detection circuit transmits a first detection signal to a boundary area of the touch areas which are not touch detected to receive a first feedback signal. The detection circuit transmits a second detection signal to a corresponding central area of the touch areas which are not touch detected to receive a second feedback signal. The touch controller compares the first feedback signal and the second feedback signal to generate a capacitance variation between the boundary area and the corresponding central area.

23 Claims, 12 Drawing Sheets

TOUCH DETECTION CIRCUIT AND TOUCH DETECTION METHOD THEREOF

BACKGROUND OF THE INVENTION

1. Field of the Invention

The invention relates to a touch detection circuit, and particularly relates to a touch detection circuit and its method used for determining whether water touches the metal frame of a smart watch.

2. Description of Related Art

A touch panel of the conventional smart watch divides a touch panel into multiple areas, and sequentially performs a touch detection on the multiple areas to receive touch data in a time division manner. For example, the touch panel of the smart watch is divided into upper part and lower part.

However, when a metal frame of the smart watch touches water, it will cause grounding since water preforms as a perfect conductor, thereby generating touch data similar to a finger touch, and resulting in a touch detection error.

SUMMARY OF THE INVENTION

The invention provides a touch detection circuit with a touch detection method which determines whether water touches the metal frame of a smart watch.

An embodiment of the invention provides a touch detection circuit. The touch detection circuit is coupled to a touch panel having a plurality of touch areas, and the touch areas include a plurality of boundary areas. The touch detection circuit includes a first detection circuit and a second detection circuit. The first detection circuit selects one of a first signal and a second signal as a first detection signal and transmits the first detection signal to one of the boundary areas of the touch areas which are not touch detected to receive a first feedback signal. The second detection circuit selects the other one of the first signal and the second signal as a second detection signal and transmits the second detection signal to a corresponding central area of the touch areas which are not touch detected to receive a second feedback signal. The corresponding central area includes touch areas which are not touch detected except the one of the boundary areas.

An embodiment of the invention provides a touch detection method adapted to a touch detection circuit coupled to a touch panel having a plurality of touch areas, and the touch areas include a plurality of boundary areas. The touch detection circuit includes a first detection circuit and a second detection circuit. The touch detection method includes: selecting, by the first detection circuit, one of a first signal and a second signal as a first detection signal; transmitting, by the first detection circuit, the first detection signal to one of the boundary areas of the touch areas which are not touch detected to receive a first feedback signal; selecting, by the second detection circuit, the other one of the first signal and the second signal as a second detection signal; transmitting, by the second detection circuit, the second detection signal to a corresponding central area of the touch areas which are not touch detected to receive a second feedback signal. The corresponding central area includes touch areas which are not touch detected except the one of the boundary areas.

Another embodiment of the invention provides a touch detection circuit. The touch detection circuit is coupled to a touch panel having a plurality of touch areas, and the touch areas include a plurality of boundary areas. The touch detection circuit includes a plurality of first detection circuits, a plurality of second detection circuit and a third detection circuit. Each of the first detection circuits selects one of a first signal and a second signal as one of a plurality first detection signals and transmits the one of first detection signals to one of the boundary areas of the touch areas which are not touch detected to receive one of a plurality of first feedback signals. Each of the second detection circuits selects the other one of the first signal and the second signal as one of a plurality of second detection signals and transmits the one of second detection signals to a corresponding central area of the touch areas which are not touch detected to receive one of a plurality of second feedback signals. The corresponding central area includes touch areas which are not touch detected except the one of the boundary areas. The third detection circuit is coupled to the first detection circuits and the second detection circuits. The first detection circuits and the second detection circuits receive the first signal from the third detection circuit.

Another embodiment of the invention provides a touch detection method adapted to a touch detection circuit coupled to a touch panel having a plurality of touch areas. The touch detection circuit includes a plurality of first detection circuits, a plurality of second detection circuits and a third detection circuit and the touch areas include a plurality of boundary areas. The touch detection method includes: selecting, by each of the first detection circuits, one of a first signal and a second signal as one of a plurality of first detection signals; transmitting, by each of the first detection circuits, the one of the first detection signals to one of the boundary areas of the touch areas which are not touch detected to receive one of a plurality of first feedback signals; selecting, by each of the second detection circuits, the other one of the first signal and the second signal as one of a plurality of second detection signals; transmitting, by each of the second detection circuits, the one of second detection signals to corresponding central area of the touch areas which are not touch detected to receive one of a plurality of second feedback signals. The corresponding central area includes touch areas which are not touch detected except the boundary areas. The first signal is received from the third detection circuit.

Based on the above, in the embodiments of the invention, in order to cope with the touch detection error caused by water contacting the metal frame of the smart watch, the embodiments of the invention provide a touch detection circuit with a touch detection method which detects the water based on the capacitance variation between the boundary area and the corresponding central area of the touch panel, so as to improve the reliability of touch detection of smart watch without affecting the normal touch detection to user's finger.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
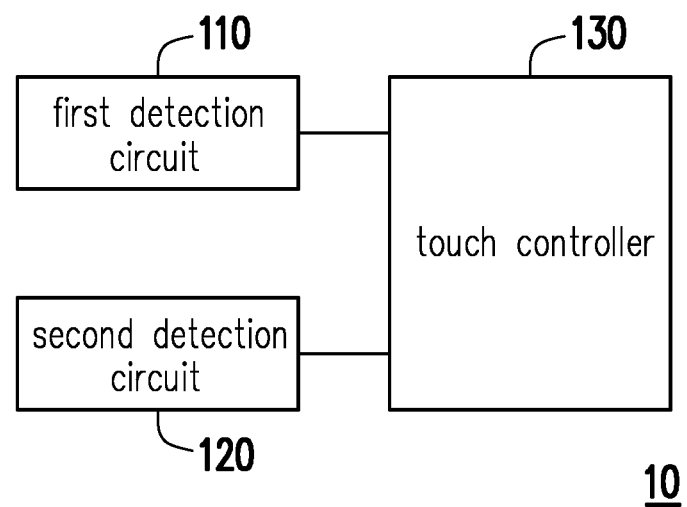
FIG. 1 is a schematic diagram illustrating a touch detection circuit according to an embodiment of the invention.

Reference will now be made in detail to the embodiments of the invention, examples of which are illustrated in the accompanying drawings. Wherever possible, the same reference numbers are used in the drawings and the description to refer to the same or like parts.

Figure 2A:
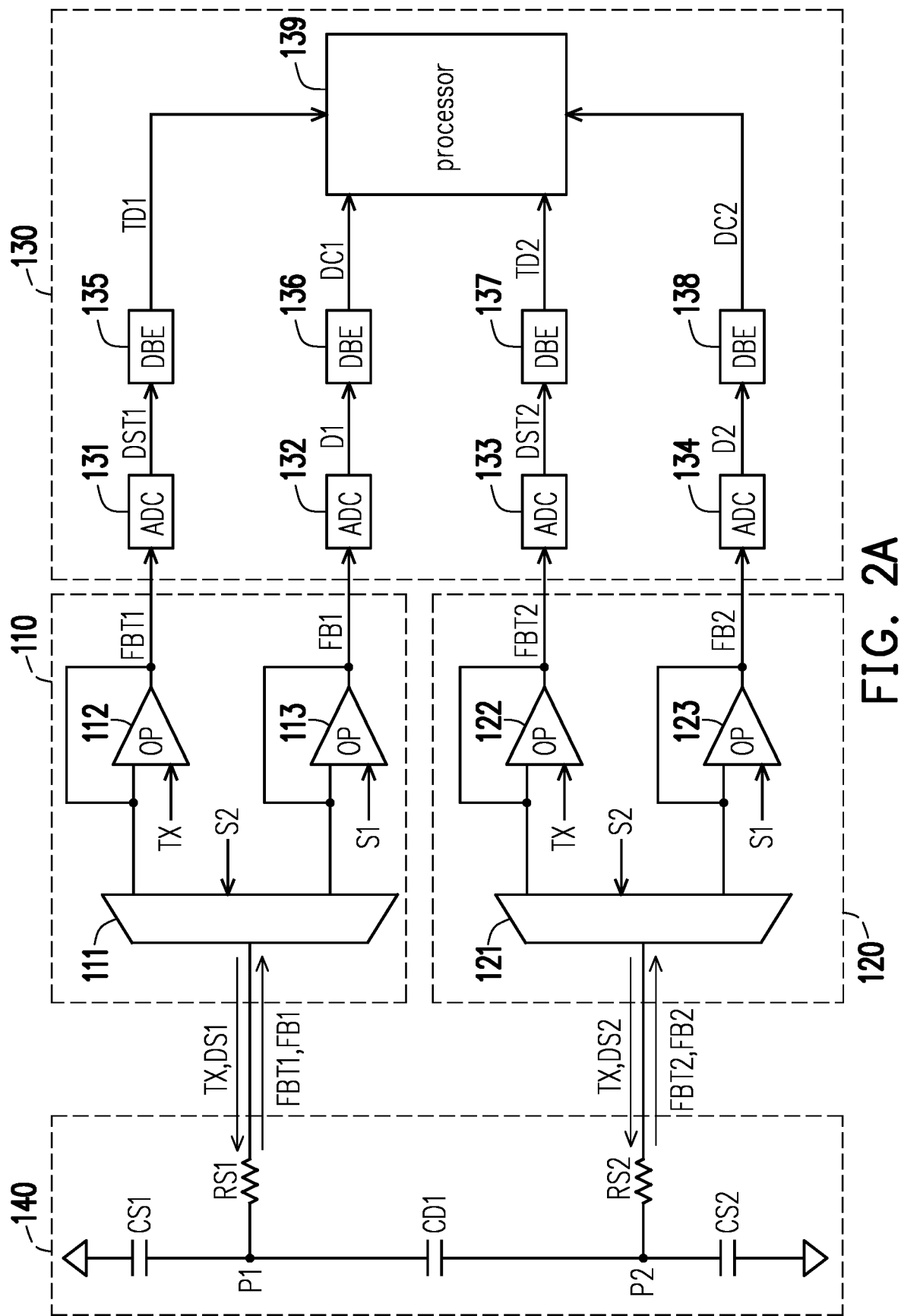
FIG. 2A is a circuit block diagram illustrating a touch detection circuit according to an embodiment of the invention.

Referring to FIG. 1 and FIG. 2A, the touch detection circuit 10 includes a first detection circuit 110, a second detection circuit 120 and a touch controller 130. The touch detection circuit 10 is coupled to a touch panel having a plurality of touch areas, for example, the touch panel 340 (layout scheme) having touch areas referring to FIG. 3A, and the touch panel 340 is coupled to a metal frame (not drawn). The metal frame surrounds the touch panel 340 of a smart watch (not drawn). The first detection circuit 110 is coupled to the touch controller 130, and the second detection circuit 120 is coupled to the touch controller 130.

The touch controller 130 may performs a touch detection on the touch areas sequentially by means of a touch detection signal TX. For example, please referring to FIG. 3A and FIG. 3B, touch pads TP2-TP33 are divided into an upper part including touch pads TP1-TP4, TP6-TP7, TP19-TP20, TP22-TP25 and a lower part including touch pads TP10-TP13, TP15-TP16, TP28-TP29, TP31-TP34. The sequence of touch detection is performed as below: in step S310, step S330, step S350 and step S370, the upper part is touch detected (sensing) and a load free driving signal LFD is applied to the lower part, and in step S320, step S340, step S360 and step S380, the lower part is touch detected (sensing) and the load free driving signal LFD is applied to the upper part. The touch detection signal TX is a time-variant signal, but not limited. In addition, some details will be described thereafter. In another embodiment, sequentially selecting touch areas for a normal touch detection would be not required by more detection circuits.

The touch controller 130 may sequentially selects a boundary area from a plurality of the boundary areas of touch areas which are not touch detected. For example, the touch controller 130 selects touch pads TP15 and TP33 in step S330 since the touch pads TP15 and TP33 belongs the boundary areas of the lower part which is not touch detected in step S330. It is noted that the steps of selecting touch pads TP15 and TP33 would be implemented by two touch detection circuits 10 according a design requirement, respectively, and following steps of transmitting and comparing are similar, but not limited. In the same way, the touch controller 130 selects touch pads TP2 and TP20 in step S340, selects touch pads TP12 and TP31 in step S350, selects touch pads TP4 and TP23 in step S360, selects touch pads TP11 and TP29 in step S370, and selects touch pad TP6 and TP24 in step S380. In another embodiment, sequentially selecting boundary areas for water detection would be not required by more detection circuits.

Next, the first detection circuit 110 selects one of a first signal S1 and a second signal S2 as a first detection signal DS1 and transmits the first detection signal DS1 to a selected boundary area of the touch areas which are not touch detected to receive a first feedback signal FB1. For example, the first detection circuit 110 selects the first signal S1 as the first detection signal DS1 and transmits the first detection signal DS1 to the selected touch pads TP15 and TP33 and receives the first feedback signal FB1 from the selected touch pads TP15 and TP33 in step S330, transmits the first detection signal DS1 to touch pads TP2 and TP20 in step S340, transmits the first detection signal DS1 to touch pads TP12 and TP31 in step S350, transmits the first detection signal DS1 to touch pads TP4 and TP23 in step S360, transmits the first detection signal DS1 to touch pads TP11 and TP29 in step S370, transmits the first detection signal DS1 to touch pad TP6 and TP24 in step S380, and respectively receives the corresponding first feedback signal FB1 in steps S340-S380.

The second detection circuit 120 selects the other one of a first signal S1 and a second signal S2 as a second detection signal DS2 and transmits the second detection signal DS2 to a corresponding central area of the touch areas which are not touch detected to receive a second feedback signal FB2. The corresponding central area includes touch areas which are not touch detected except the one of the boundary areas. For example, the second detection circuit 120 selects the second signal S2 as the second detection signal DS2 and transmits the second detection signal S2 to touch pads TP10, TP11, TP12, TP13, TP16, TP28, TP29, TP31, TP32 and TP34 and receives the second feedback signal FB2 from the touch pads TP10, TP13, TP16, TP28, TP32 and TP34 in step S330 since those touch pads belongs the corresponding central area of the lower part which is not touch detected in step S330. The second detection circuit 120 transmits the second detection signal S2 to touch pads TP1, TP3, TP4, TP6, TP7, TP19, TP22, TP23, TP24 and TP25 in step S340, and receives the corresponding second feedback signal FB2 in steps S340. The step S350 to step S380 are similar and will not be repeated.

The touch controller 130 compares the first feedback signal FB1 with the second feedback signal FB2 to generate a capacitance variation between the selected boundary area and the corresponding central area. In step S330, the touch controller 130 receives the first feedback signal FB1 and the second feedback signal FB2 from the first detection circuit 110 and the second detection circuit 120, and compares the first feedback signal FB1 and the second feedback signal FB2 which jointly include the capacitance variation information between the selected boundary area (TP15 and TP33) and the corresponding central area (TP10, TP11, TP12, TP13, TP16, TP28, TP29, TP31, TP32 and TP34) in step S330, so as to generate a capacitance variation between the selected boundary area and the corresponding central area in step S330. Some other details will be described thereafter, and the comparing action in steps S340-S380 will not be repeated.

Referring to FIG. 2A, the first detection circuit 110 includes a first multiplexer 111, a first operation amplifier 112 and a second operation amplifier 113. The first multiplexer 111 is coupled to the touch panel 140 (equivalent circuit), selects one of the touch detection signal TX, the first signal S1 and the second signal S2, and transmits the selected one to a node P1 of the touch panel 140 according to a control signal (not drawn) from the touch controller 130.

A first input terminal of the first operation amplifier 112 is coupled to the first multiplexer 111, a second input terminal of the first operation amplifier 112 receives the touch detection signal TX, and an output terminal of the first operation amplifier 112 is coupled to the first input terminal of the first operation amplifier 112.

A first input terminal of the second operation amplifier 113 is coupled to the first multiplexer 111, a second input terminal of the second operation amplifier 113 receives the first signal S1, and an output terminal of the second operation amplifier 113 is coupled to the first input terminal of the second operation amplifier 113.

In addition, the first multiplexer 111 transmits the touch detection signal TX to touch areas which are touch detected to receive a feedback signal FBT1 of the touch detection signal TX, and transmits the first detection signal DS1 to the selected boundary area of the touch areas which are not touch detected to receive the first feedback signal FB1. Giving the step S330 as an example, the first multiplexer 111 transmits the touch detection signal TX to upper part of the touch panel 340 to receive a feedback signal FBT1 from the upper part of the touch panel 340, and transmits the first detection signal DS1 to the touch panels TP15 and TP33 to receive the first feedback signal FB1 from the touch panels TP15 and TP33.

Referring to FIG. 2A, the second detection circuit 120 includes a second multiplexer 121, a third operation amplifier 122 and a fourth operation amplifier 123. The second multiplexer 121 is coupled to the touch panel 140 (equivalent circuit), and the according to a control signal (not drawn) from the touch controller 130, the second multiplexer 121 selects one of the touch detection signal TX, the first signal S1 and the second signal S2 and transmits the selected one to a node P2 of the touch panel 140.

A first input terminal of the third operation amplifier 122 is coupled to the second multiplexer 121, a second input terminal of the third operation amplifier 122 receives the touch detection signal TX, and an output terminal of the third operation amplifier 122 is coupled to the first input terminal of the third operation amplifier 122.

A first input terminal of the fourth operation amplifier 123 is coupled to the second multiplexer 121, a second input terminal of the fourth operation amplifier 123 receives the first signal S1, and an output terminal of the fourth operation amplifier 123 is coupled to the first input terminal of the fourth operation amplifier 123.

In addition, the second multiplexer 121 transmits the touch detection signal TX to touch areas which are touch detected to receive a feedback signal FBT2 of the touch detection signal TX, and transmits the second detection signal DS2 to the corresponding central area which is not touch detected to receive the second feedback signal FB2. Giving the step S330 as an example, the second multiplexer 121 transmits the touch detection signal TX to upper part of the touch panel 340 to receive a feedback signal FBT2 from the upper part of the touch panel 340, and transmits the second detection signal DS2 to the corresponding central area of lower part(TP10, TP11, TP12, TP13, TP16, TP28, TP29, TP31, TP32 and TP34) to receive the second feedback signal FB2 from the corresponding central area (TP10, TP11, TP12, TP13, TP16, TP28, TP29, TP31, TP32 and TP34).

Referring to FIG. 2A, the touch controller 130 includes analog-to-digital convertors 131-134, digital back-end circuits 135-138, and a processor 139. The analog-to-digital convertors 131 and 132 are coupled to the first detection circuit 110, and the analog-to-digital convertors 133 and 134 are coupled to the second detection circuit 120. The analog-to-digital convertors 132, 134 convert the first feedback signal FB1 and the second feedback signal FB2 to a first digital signal D1 and a second digital signal D2, respectively. The analog-to-digital convertors 131, 133 converts the feedback signals FBT1, FBT2 of the touch detection signal TX to touch digital signals DST1, DST2.

The digital back-end circuits 135 and 136 are respectively coupled to the analog-to-digital convertors 131 and 132, and the digital back-end circuits 137 and 138 are respectively coupled to the analog-to-digital convertors 133 and 134. The digital back-end circuits 136 and 138 respectively perform a digital signal processing on the first digital signal D1 and the second digital signal D2 to generate a first capacitance data DC1 and a second capacitance data DC2. The digital back-end circuits 135 and 137 respectively perform the digital signal processing on the touch digital signals DST1, DST2 to generate touch data TD1 and TD2. It is noted that the digital signal processing includes digital filtering to reduce noise, but not limited in the invention.

The processor 139 is coupled to the digital back-end circuits 135-138, and the processor 139 computes a difference between the first capacitance data DC1 and the second capacitance data DC2 to generate the capacitance variation between the selected boundary area and the corresponding central area. The processor also receives the touch data TD1 and TD2 to perform a normal touch computing.

The touch panel 140 (equivalent circuit) includes equivalent resistors RS1, RS2, and equivalent capacitors CD1, CS1 and CS2. It is noted that the equivalent resistors RS1, RS2, and the equivalent capacitors CD1, CS1 and CS2 are merely equivalent devices, rather than real devices. The equivalent capacitor CD1 between the node P1 and the node P2 stands for the equivalent capacitor between the boundary areas and corresponding central area of the touch panel 340. In addition, the first capacitance data DC1 and the second capacitance data DC2 correspond to the voltages of the node P1 and the node P2, respectively.

It is worth mentioning that in order to generate the capacitance variation of the capacitor CD1, the first detection signal DS1 and the second detection signal DS2 should be different and at least one of the first detection signal DS1 and the second detection signal DS2 should be a time-variant signal due to an measureable voltage variation between the node P1 and the node P2. In some embodiments as shown in Type 1 of Table 1, the first detection signal DS1 is a DC voltage signal ND, and the second detection signal DS2 is a load free driving signal LFD in phase with the touch detection signal TX, where the touch detection signal may be a time-variant signal for the touch detection such as a square wave. In other embodiments as shown in Type 2 of Table 1, the first detection signal DS1 is the touch detection signal TX, and the second detection signal DS2 is an inverse touch detection signal TX_AUX.

TABLE 1

|  | DS1 | DS2 |
| --- | --- | --- |
| Type 1 | ND | LFD |
| Type 2 | TX | TX_AUX |

Figure 3A:
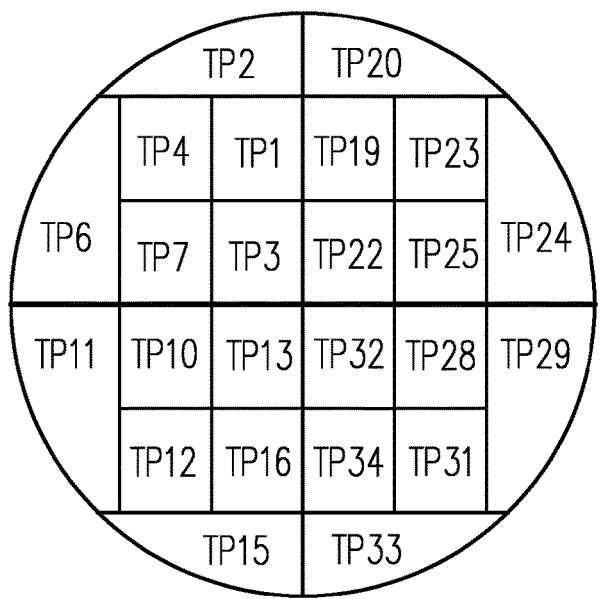
FIG. 3A is a schematic diagram illustrating a touch panel according to an embodiment of the invention.
Figure 3B:
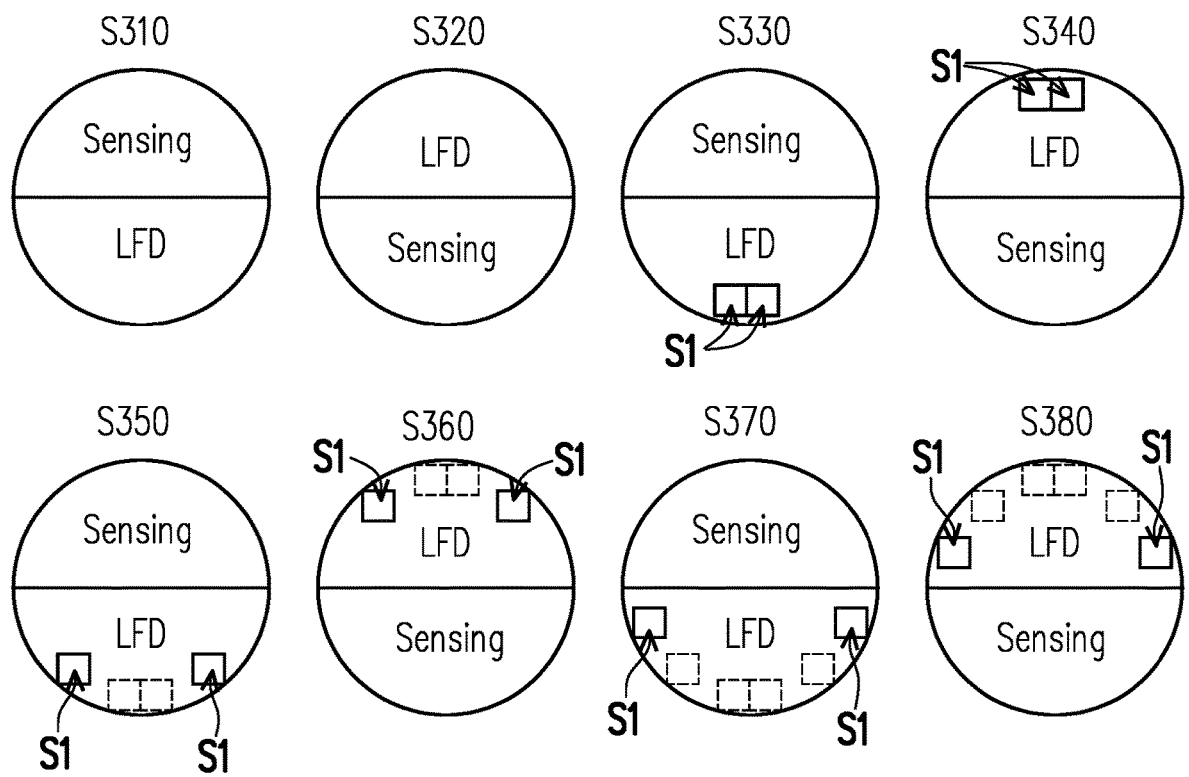
FIG. 3B is a schematic diagram illustrating a detecting mechanism according to an embodiment of the invention.

Referring to FIG. 2A, FIGS. 3A and 3B, based on all the capacitance variations between the node P1 (standing for the boundary areas) and the node P2 (standing for the corresponding central area) sequentially generated in steps S330-S380, the processor 139 determines whether there exists water touching the metal frame of the smart watch. In details, the processor 139 determines whether the boundary areas of the touch panel 340 are coupled to the metal frame of the smart watch through the water based on the values of capacitance variations. It may be implemented by determining whether the sign of the computed capacitance variation is positive value greater than a threshold since the capacitance variation caused by the water is a positive value but the capacitance variation caused by a user's finger is a negative value, but not limited.

Figure 2B:
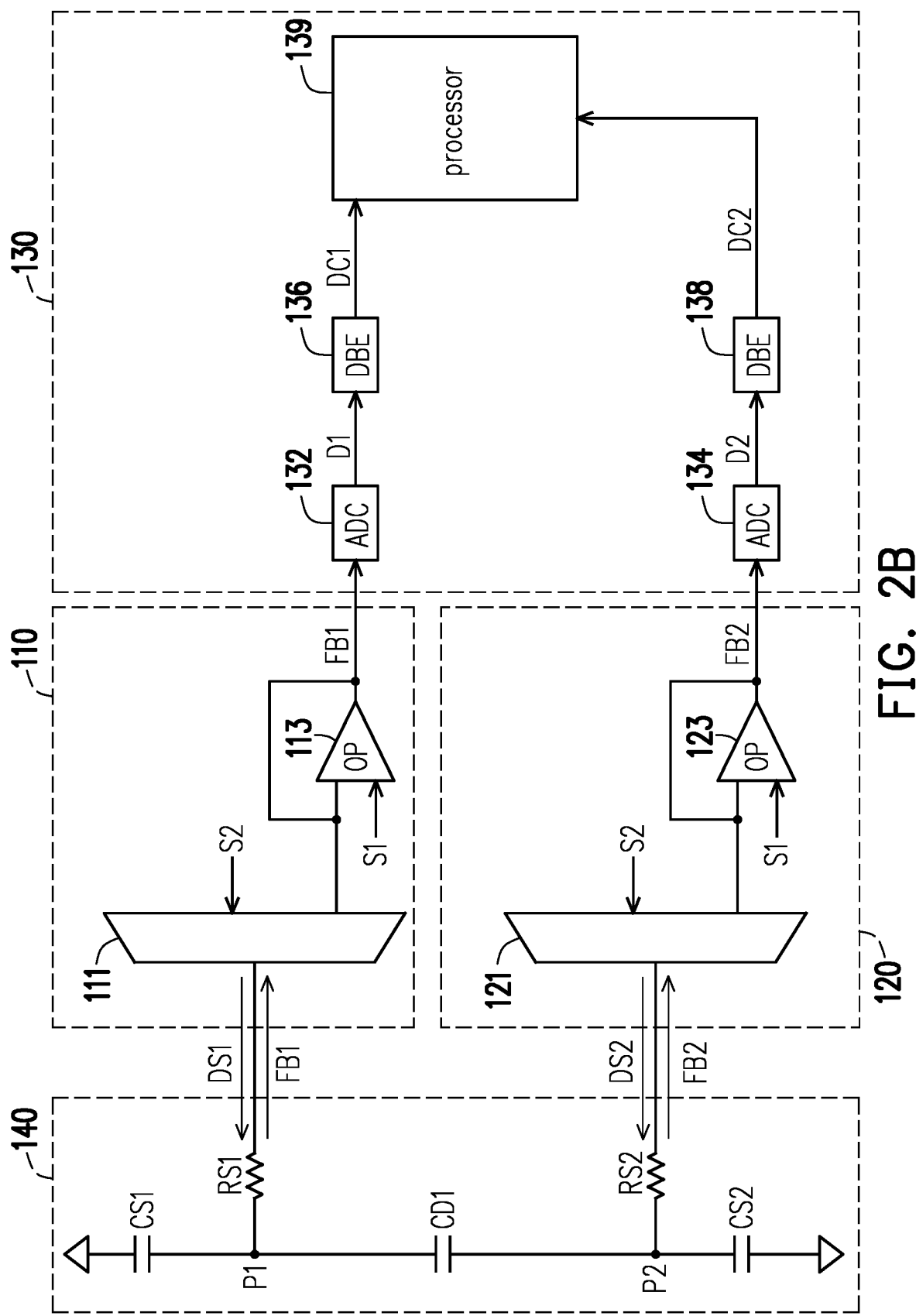
FIG. 2B is a circuit block diagram illustrating a touch detection circuit according to an embodiment of the invention.

Referring to FIG. 2B, there are no paths for the normal touch detection compared to FIG. 2A. In this embodiment, the touch detection circuit 10 performs a determination whether there exists water touching the metal frame of the smart watch without performing normal touch detections. The other details of the operation in FIG. 2B would be referring to the foregoing description of FIG. 2A.

Figure 4:
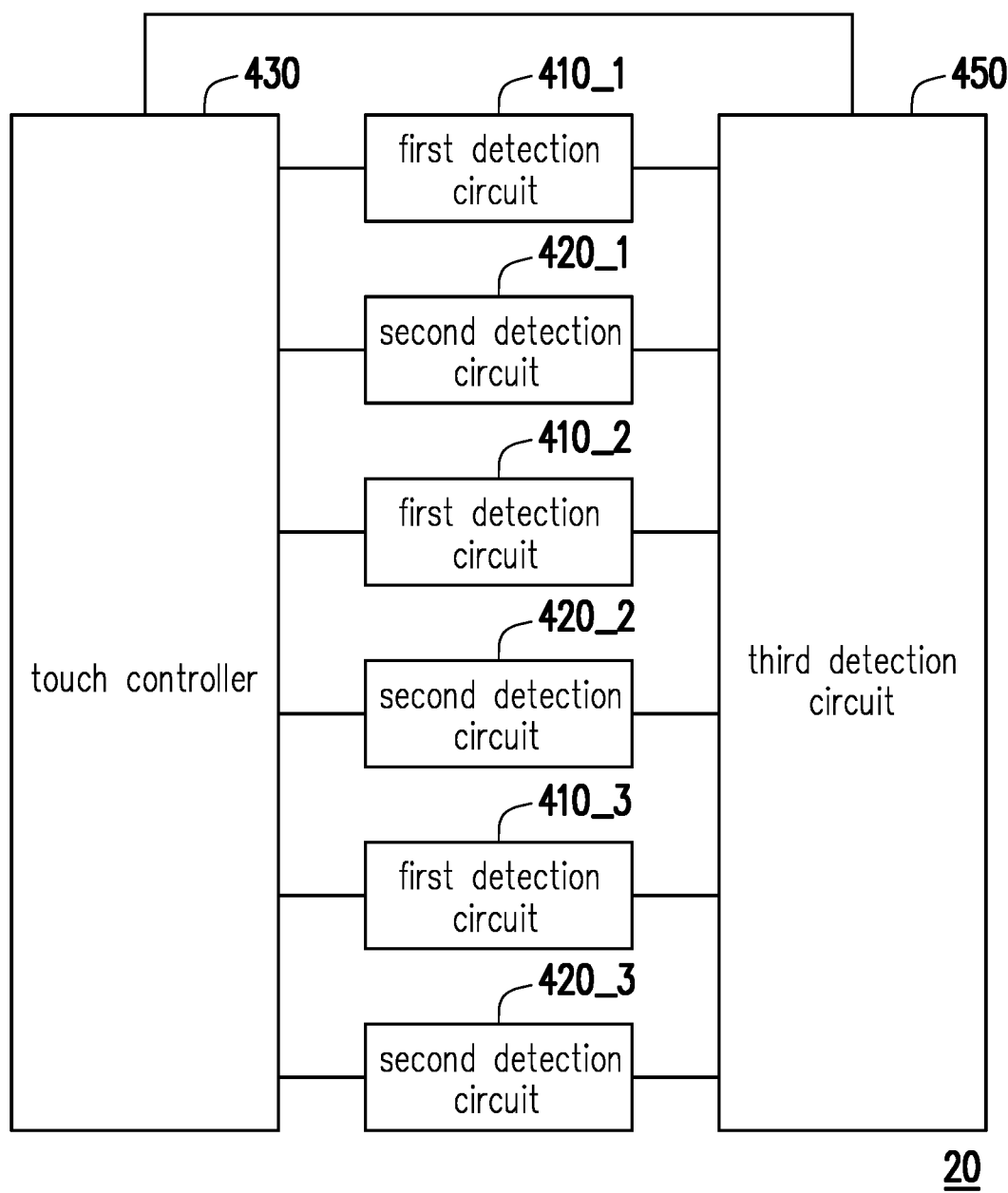
FIG. 4 is a schematic diagram illustrating a touch detection circuit according to another embodiment of the invention.
Figure 5A:
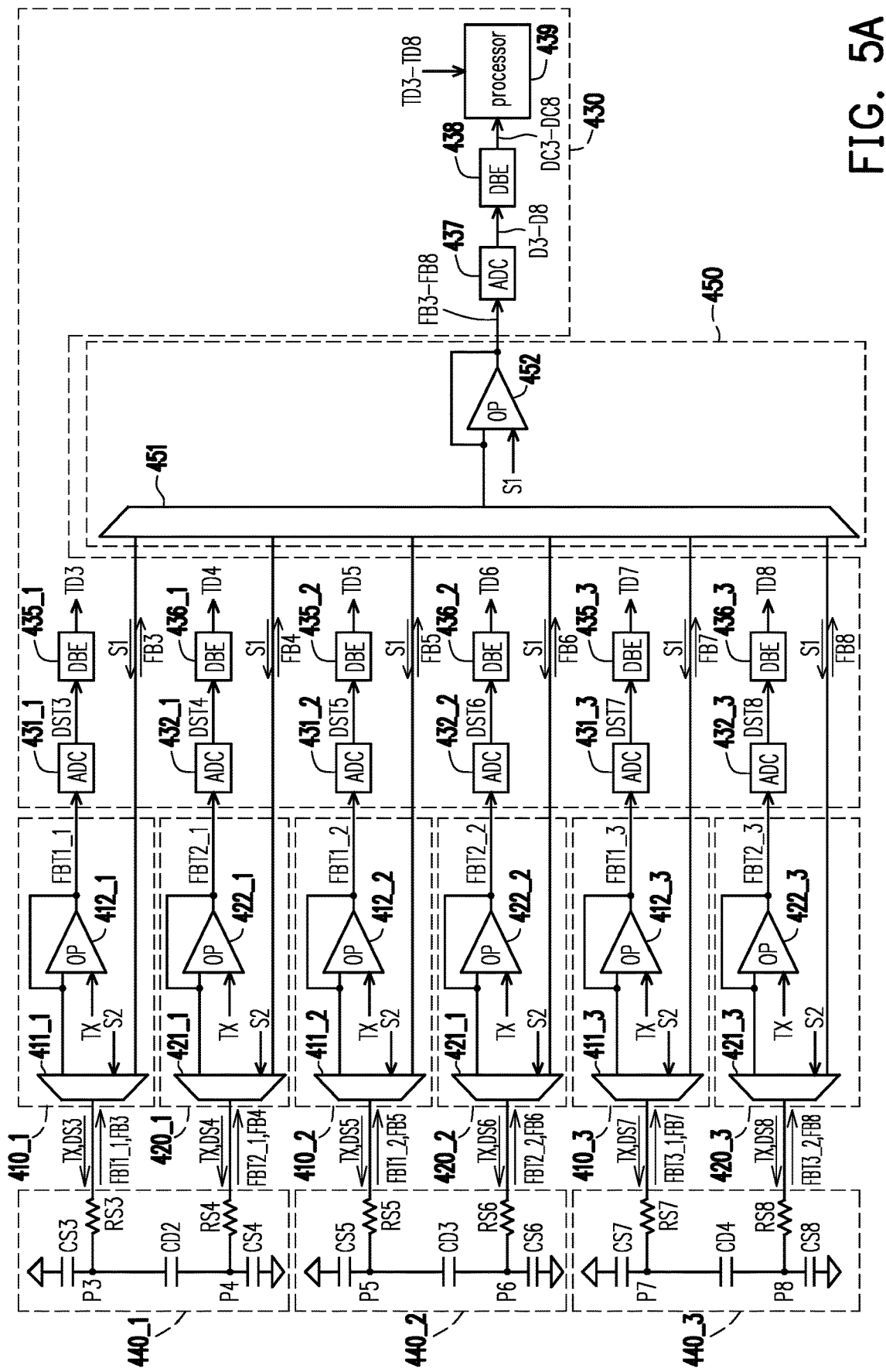
FIG. 5A is a circuit block diagram illustrating a touch detection circuit according to another embodiment of the invention.

Referring to FIG. 4 and FIG. 5A, the touch detection circuit 20 includes first detection circuits 410_1-410_3, second detection circuits 420_1-420_3, a touch controller 430 and a third detection circuit 450. The touch detection circuit 20 is coupled to a touch panel having a plurality of touch areas, for example, the touch panel 340 (layout scheme) having touch areas referring to FIG. 3A, and the touch panel 340 is coupled to a metal frame (not drawn). The metal frame surrounds the touch panel 340 of a smart watch (not drawn). The first detection circuits 410_1-410_3 are coupled to the touch controller 430, the second detection circuits 420_1-420_3 are coupled to the touch controller 430, and the third detection circuit 450 is coupled to the first detection circuits 410_1-410_3, the second detection circuits 420_1-420_3 and the touch controller 430.

The touch controller 430 may perform a touch detection on the touch areas sequentially by means of a touch detection signal TX. For example, please referring to FIG. 3A and FIG. 3B, touch pads TP2-TP33 are divided into an upper part including touch pads TP1-TP4, TP6-TP7, TP19-TP20, TP22-TP25 and a lower part including touch pads TP10-TP13, TP15-TP16, TP28-TP29, TP31-TP34. The sequence of touch detection is performed as below: in step S610, the upper part is touch detected (sensing) and a load free driving signal LFD is applied to the corresponding central area of the lower part; in step S620, the lower part is touch detected (sensing) and the load free driving signal LFD is applied to the corresponding central area of the upper part. The touch detection signal TX is a time-variant signal, but not limited.

Some details will be described thereafter. In another embodiment, sequentially selecting touch areas for a normal touch detection would be not required by more detection circuits.

Next, the first detection circuits 410_1-410_3 receives first signals S1 from the third detection circuit 450, select one of a first signal S1 and a second signal S2 as first detection signals DS3, DS5, DS7 and transmit first detection signals DS3, DS5, DS7 to boundary areas of the touch areas which are not touch detected to receive first feedback signals FB3, FB5 and FB7, respectively. Specifically, the first detection circuits 410_1-410_3 transmit the first detection signals DS3, DS5, DS7 to the touch pads TP11, TP12, TP15, TP29, TP31, TP33 and receive first feedback signals FB3, FB5 and FB7 from the touch pads TP11, TP12, TP15, TP29, TP31, TP33 in step S610, and transmits the first detection signals DS3, DS5, DS7 to the touch pads TP2, TP4, TP6, TP20, TP23 and TP24 and receives first feedback signals FB3, FB5 and FB7 from the touch pads TP2, TP4, TP6, TP20, TP23 and TP24 in step S620, respectively.

The second detection circuits 420_1-420_3 receive first signals S1 from the third detection circuit 450, select one of a first signal S1 and a second signal S2 as second detection signals and transmit the second detection signals DS4, DS6, DS8 to the corresponding central area of the touch areas which are not touch detected to receive second feedback signals FB4, FB6 and FB8, respectively. Specifically, the second detection circuits 420_1-420_3 transmit the second detection signals DS4, DS6, DS8 to touch pads TP10, TP13, TP16, TP28, TP32 and TP34 and receive the second feedback signal FB4, FB6 and FB8 from the touch pads TP10, TP13, TP16, TP28, TP32 and TP34 in step S610 since those touch pads belongs the corresponding central area of the lower part which is not touch detected in step S610. Similarly, the second detection circuits 420_1-420_3 transmit the second detection signals DS4, DS6, DS8 to touch pads TP1, TP3, TP7, TP19, TP22 and TP25 in step S620 and receive the second feedback signals FB4, FB6 and FB8 from the touch pads TP1, TP3, TP7, TP19, TP22 and TP25 in step S620.

The touch controller 430 compares the first feedback signals FB3, FB5 and FB7 with the second feedback signals FB4, FB6 and FB8 to generate a total capacitance variation between the boundary areas and the corresponding central area. In step S610, the touch controller 430 receives the first feedback signals FB3, FB5 and FB7 and the second feedback signals FB4, FB6 and FB8 from the first detection circuits 410_1-410_3 and the second detection circuits 420_1-420_3, and compares the first feedback signals FB3, FB5 and FB7 with the second feedback signals FB4, FB6 and FB8 which jointly include the capacitance variation information between the boundary areas (TP11, TP12, TP15, TP29, TP31, TP33) and the corresponding central area (TP10, TP13, TP16, TP28, TP32 and TP34) in step S610, so as to generate a total capacitance variation between the boundary areas and the corresponding central area by an accumulation operation in step S610. Some other details will be described thereafter, and the comparing action in step S620 will not be repeated.

Referring to FIG. 5A, the first detection circuit 410_1 includes a first multiplexer 411_1 and a first operation amplifier 412_1, the first detection circuit 410_2 includes a first multiplexer 411_2 and a first operation amplifier 412_2, and the first detection circuit 410_3 includes a first multiplexer 411_3 and a first operation amplifier 412_3. The first multiplexer 411_1 is coupled to the touch panel 440_1 (equivalent circuit), selects one of the touch detection signal TX, the first signal S1 and the second signal S2, and transmits the selected one to a node P3 of the touch panel 440_1 according to a control signal (not drawn) from the touch controller 430. The first multiplexer 411_2 and the first multiplexer 411_3 are similar and will not repeated.

A first input terminal of the first operation amplifier 412_1 is coupled to the first multiplexer 411_1, a second input terminal of the first operation amplifier 412_1 receives the touch detection signal TX, and an output terminal of the first operation amplifier 412_1 is coupled to the first input terminal of the first operation amplifier 412_1. The first operation amplifier 412_2 and the first operation amplifier 412_3 are similar and will not repeated.

In addition, the first multiplexer 411_1 transmits the touch detection signal TX to touch areas which are touch detected to receive a feedback signal FBT1_1 of the touch detection signal TX, and transmits the first detection signal DS1 to the corresponding boundary area of the touch areas which are not touch detected to receive the first feedback signal FB3. Giving the step S610 as an example, the first multiplexer 411_1 transmits the touch detection signal TX to upper part of the touch panel 340 to receive a feedback signal FBT1_1 from the upper part of the touch panel 340, and transmits the first detection signal DS3 to the touch panels TP15 and TP33 to receive the first feedback signal FB3 from the touch panels TP15 and TP33. Similarly, the first multiplexer 411_2 transmits the touch detection signal TX to touch areas which are touch detected to receive a feedback signal FBT1_2 of the touch detection signal TX, and transmits the first detection signal DS5 to the touch panels TP12 and TP31 of the touch areas which are not touch detected to receive the first feedback signal FB5. The first multiplexer 411_3 transmits the touch detection signal TX to touch areas which are touch detected to receive a feedback signal FBT1_3 of the touch detection signal TX, and transmits the first detection signal DS7 to the touch panels TP11 and TP29 of the touch areas which are not touch detected to receive the first feedback signal FB7.

Referring to FIG. 5A, the second detection circuit 420_1 includes a second multiplexer 421_1 and a second operation amplifier 422_1, the second detection circuit 420_2 includes a second multiplexer 421_2 and a second operation amplifier 422_2, and the second detection circuit 420_3 includes a second multiplexer 421_3 and a second operation amplifier 422_3. The second multiplexer 421_1 is coupled to the touch panel 440_1 (equivalent circuit), selects one of the touch detection signal TX, the first signal S1 and the second signal S2, and transmits the selected one to a node P4 of the touch panel 440 according to a control signal (not drawn) from the touch controller 430. The second multiplexer 421_2 and the second multiplexer 421_3 are similar and will not repeated.

A first input terminal of the second operation amplifier 422_1 is coupled to the second multiplexer 421_1, a second input terminal of the second operation amplifier 422_1 receives the touch detection signal TX, and an output terminal of the second operation amplifier 422_1 is coupled to the first input terminal of the second operation amplifier 422_1. The second operation amplifier 422_2 and the second operation amplifier 422_3 are similar and will not repeated.

In addition, the second multiplexer 421_1 transmits the touch detection signal TX to touch areas which are touch detected to receive a feedback signal FBT2_1 of the touch detection signal TX, and transmits the second detection signal DS4 to the corresponding central area of the touch areas which are not touch detected to receive the second feedback signal FB4. Giving the step S610 as an example, the second multiplexer 421_1 transmits the touch detection signal TX to upper part of the touch panel 340 to receive a feedback signal FBT2_1 from the upper part of the touch panel 340, and transmits the second detection signal DS4 to the touch panels TP10, TP13, T16, T28, T32 and T34 to receive the second feedback signal FB4 from the touch panels TP10, TP13, T16, T28, T32 and T34. Similarly, the second multiplexer 421_2 transmits the touch detection signal TX to touch areas which are touch detected to receive a feedback signal FBT2_2 of the touch detection signal TX, and transmits the second detection signal DS6 to the touch panels TP10, TP13, T16, T28, T32 and T34 of the touch areas which are not touch detected to receive the second feedback signal FB6. The second multiplexer 421_3 transmits the touch detection signal TX to touch areas which are touch detected to receive a feedback signal FBT2_3 of the touch detection signal TX, and transmits the second detection signal DS8 to the touch panels TP10, TP13, T16, T28, T32 and T34 of the touch areas which are not touch detected to receive the second feedback signal FB8.

Referring to FIG. 5A, the third detection circuit 450 comprises a third multiplexer 451 and a third operation amplifier 452. The third multiplexer 451 is coupled to the first detection circuits 410_1-410_3 and the second detection circuits 420_1-420_3, and receives the first feedback signals FB3, FB5, FB7 and the second feedback signals FB4, FB6, FB8 from the first detection circuits 410_1-410_3 and the second detection circuits 420_1-420_3. A first input terminal of the third operation amplifier 452 is coupled to the third multiplexer 451, a second input terminal of the third operation amplifier 452 receives the first signal S1, and an output terminal of the third operation amplifier 452 is coupled to the first input terminal of the third operation amplifier 452. The third multiplexer 451 transmits the first detection signal S1 to the first detection circuits 410_1-410_3 and receives the first feedback signals FB3, FB5, FB7 from the first detection circuits 410_1-410_3, and the third multiplexer 451 receives the second feedback signals FB4, FB6, FB8 from the second detection circuits 420_1-420_3. It is noted that foregoing operations of the third multiplexer 451 is operated sequentially with a time division manner.

Referring to FIG. 5A, the touch controller 430 includes first analog-to-digital convertors 431_1-431-3 and 432_1-432_3, first digital back-end circuits 435_1-435_3 and 436_1-436_3, a second analog-to-digital convertor 437, a second digital back-end circuit 438 and a processor 439. The first analog-to-digital convertors 431_1-431_3 are respectively coupled to the first detection circuits 410_1-410_3, and the first analog-to-digital convertors 432_1-432_3 are respectively coupled to the second detection circuits 420_1-420_3. The first analog-to-digital convertors 431_1-431-3 and 432_1-432_3 convert the feedback signals FBT1_1-FBT1_3 and FBT2_1-FBT2_3 of the touch detection signal TX to touch digital signals DST3-8.

The first digital back-end circuits 435_1-435_3 are respectively coupled to the first analog-to-digital convertors 431_1-431-3, and the first digital back-end circuits 436_1-436_3 are respectively coupled to the first analog-to-digital convertors 432_1-432-3. The first digital back-end circuits 435_1-435_3 and 436_1-436_3 respectively perform a digital signal processing on the touch digital signals DST3-DST8 to generate touch data TD3-TD8. It is noted that the digital signal processing includes digital filtering to reduce noise, but not limited in the invention.

The second analog-to-digital convertor 437 is coupled to the third detection circuit 450, receives the first feedback signals FB3, FB5, FB7 and the second feedback signals FB4, FB6, FB8 from the third operation amplifier 452 of the third detection circuit 450, and converts the first feedback signals FB3, FB5, FB7 and the second feedback signals FB4, FB6, FB8 to first digital signals D3, D5, D7 and second digital signals D4, D6, D8 in sequence.

The second digital back-end circuit 438 is coupled to second analog-to-digital convertor 437, and the second digital back-end circuit 438 receives the first digital signals D3, D5, D7 and the second digital signals D4, D6, D8 and perform a digital signal processing on the first digital signals D3, D5, D7 and the second digital signals D4, D6, D8 to generate first capacitance data DC3, DC5, DC7 and second capacitance data DC4, DC6, DC8.

The processor 439 is coupled to the second digital back-end circuit 438, and the processor 139 computes a difference between a sum of the first capacitance data DC3, DC5, DC7 and a sum of the second capacitance data DC4, DC6, DC8 to generate the total capacitance variation between the boundary areas and the corresponding central area. In this embodiment of FIG. 0.5A, the processor also receives the touch data TD3-TD8 to perform a normal touch computing.

The touch panels 440_1, 440_2, 440_3 (equivalent circuits) includes equivalent resistors RS3-RS8, and equivalent capacitors CD2-CD4, CS3-CS8. It is noted that the equivalent resistors RS3-RS8, and the equivalent capacitors CD2-CD4, CS3-CS8 are merely equivalent devices, rather than real devices. The equivalent capacitor CD2 between the node P3 and the node P4, the equivalent capacitor CD3 between the node P5 and the node P6, and the equivalent capacitor CD4 between the node P7 and the node P8 jointly stand for the equivalent capacitors between the boundary areas and corresponding central area of the touch panel 340 in FIG. 6. In addition, the first capacitance data DC3, DC5, DC7 and the second capacitance data DC4, DC6, DC8 correspond to the voltages of the nodes P3, P5, P7 and the nodes P4, P6, P8, respectively.

It is worth mentioning that in order to generate the capacitance variation of the capacitors CD2, CD3, CD4, the first detection signals DS3, DS5, DS7 and the second detection signals DS4, DS6, DS8 should be different, and the first detection signals DS3, DS5, DS7 or the second detection signals DS4, DS6, DS8 should be time-variant signals due to an measureable voltage variation between the nodes P3, P5, P7 and the nodes P4, P6, P8. In some embodiments as shown in Type 1 of Table 1, the first detection signals DS3, DS5, DS7 are a DC voltage signal ND, and the second detection signals DS4, DS6, DS8 are a load free driving signal LFD in phase with the touch detection signal TX. In other embodiments as shown in Type 2 of Table 1, the first detection signals S1 are the touch detection signal TX, and the second detection signals S2 are an inverse touch detection signal TX_AUX.

Figure 6:
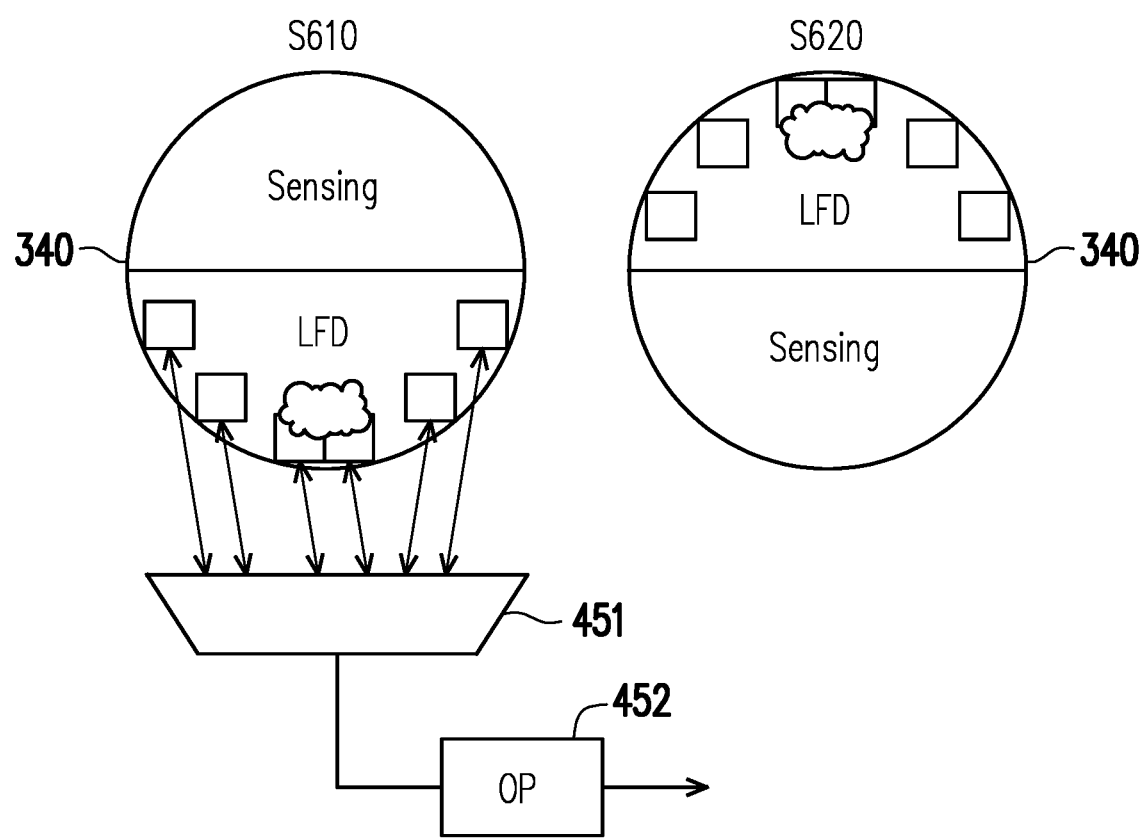
FIG. 6 is a schematic diagram illustrating a detecting mechanism according to another embodiment of the invention.

Referring to FIG. 5A and FIG. 6, based on all the capacitance variations between the nodes P3, P5, P7 (standing for the boundary areas) and the nodes P4, P6, P8 (standing for the corresponding central area) generated in steps S610-S620, the processor 439 determines whether there exists water touching the metal frame of the smart watch. In details, the processor 439 determines whether the boundary areas of the touch panel 340 are coupled to the metal frame of the smart watch through the water based on the values of capacitance variations. It is implemented by determining whether the sign of the computed capacitance variation is positive value greater than a threshold since the capacitance variation caused by the water is a positive value but the capacitance variation caused by a user's finger is negative value. Based on aforementioned, the processor 439 determines this touch is caused by the user's finger or the water with the metal frame.

Figure 5B:
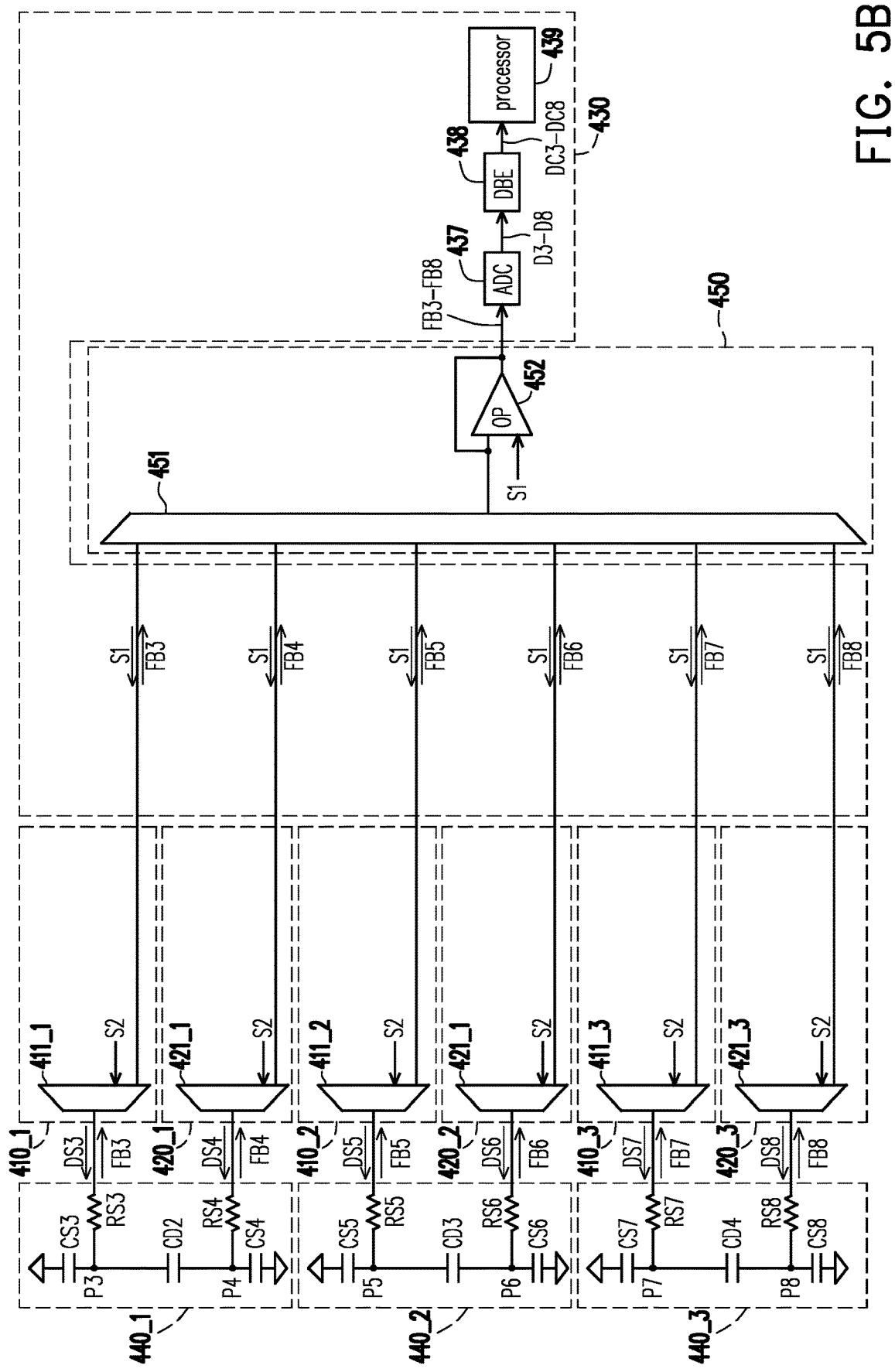
FIG. 5B is a circuit block diagram illustrating a touch detection circuit according to another embodiment of the invention.

Referring to FIG. 5B, there are no paths for the normal touch detection compared to FIG. 5A. In this embodiment, the touch detection circuit 20 performs a determination whether there exists water touching the metal frame of the smart watch without performing normal touch detections. The other details of the operation in FIG. 5B would be referring to the foregoing description of FIG. 5A.

Figure 7:
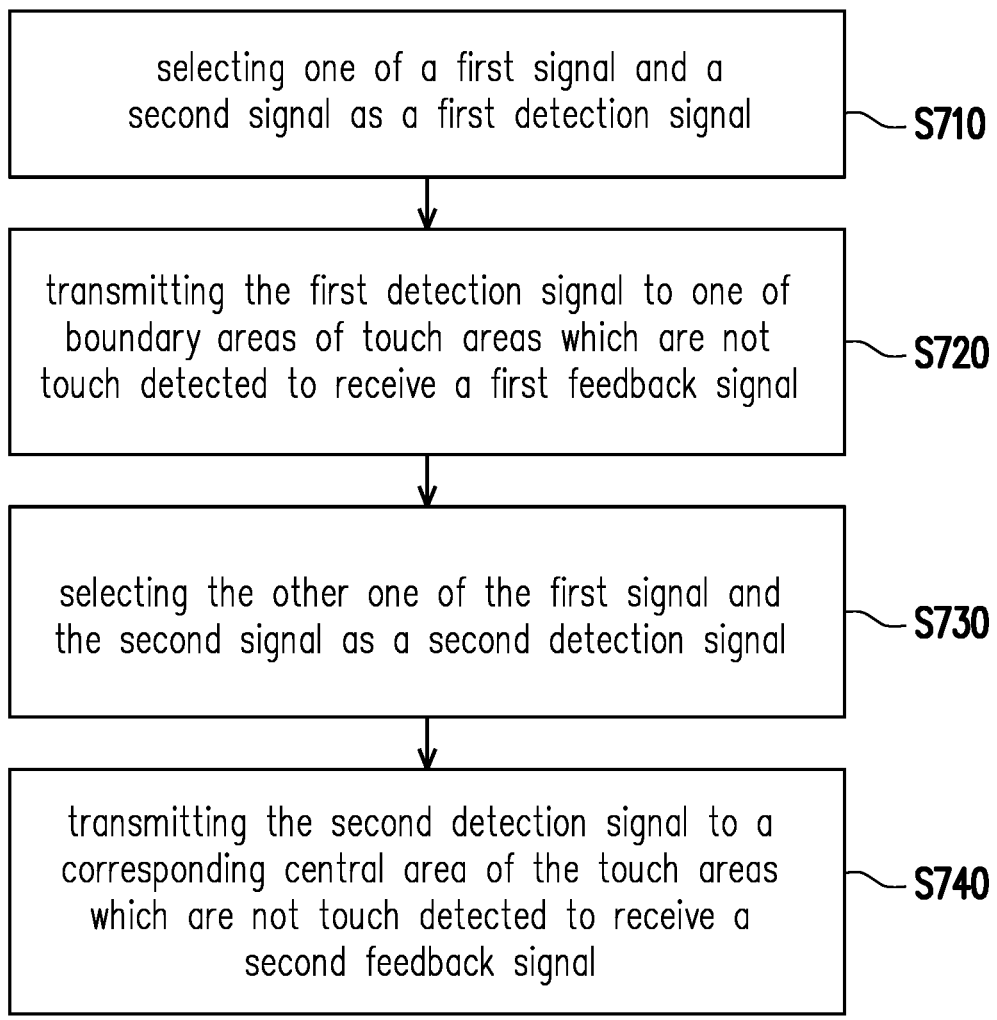
FIG. 7 is a flowchart illustrating a touch detection method according to an embodiment of the invention.

FIG. 7 illustrates a flow chart of a touch detection method according to an embodiment of the disclosure. The touch detection method is adapted to a touch detection circuit, and the touch detection circuit is coupled to a touch panel having a plurality of touch area where the touch detection circuit comprises a first detection circuit and a second detection circuit and the touch areas comprise a plurality of boundary areas. The touch detection method includes steps as below. In step S710, the first detection circuit selects one of a first signal and a second signal as a first detection signal. Next, in step S720, the first detection circuit transmits the first detection signal to one of the boundary areas of the touch areas which are not touch detected to receive a first feedback signal. The second detection circuit selects the other one of the first signal and the second signal as a second detection signal in step S730, and transmits the second detection signal to a corresponding central area of the touch areas which are not touch detected to receive a second feedback signal in step S740.

Figure 8:
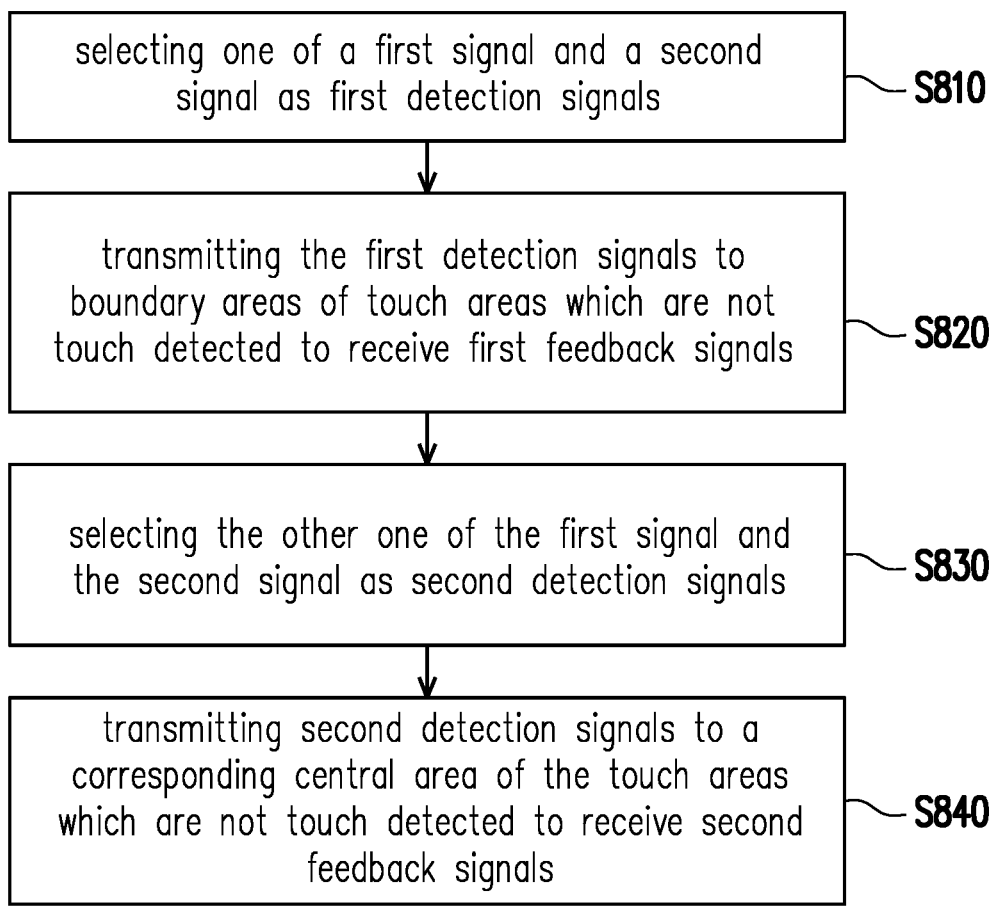
FIG. 8 is a flowchart illustrating a touch detection method according to another embodiment of the invention.

FIG. 8 illustrates a flow chart of a touch detection method according to another embodiment of the disclosure. FIG. 8 is similar with FIG. 7, and the difference between FIG. 8 and FIG. 7 are merely the number of first detection signals and the number of second detection signals. As such, steps S810, S820, S830 and S840 will not be repeated.

Figure 9:
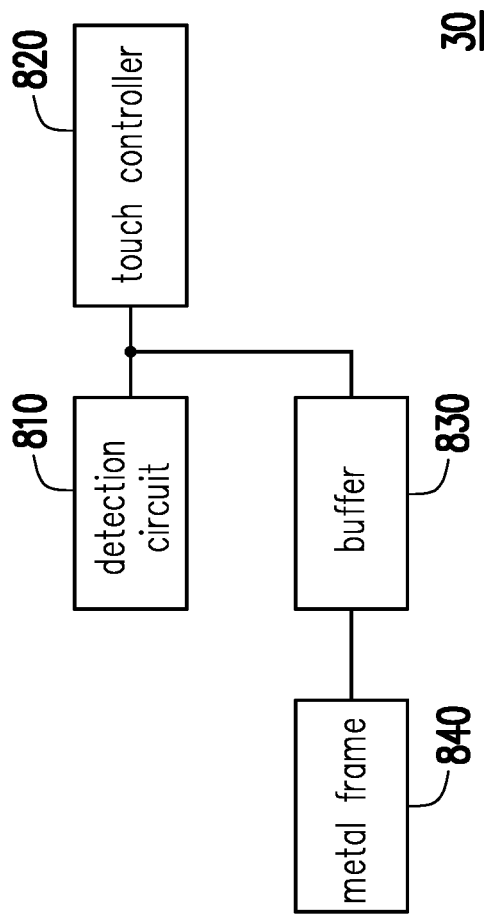
FIG. 9 is a schematic diagram illustrating a touch detection circuit according to another embodiment of the invention.
Figure 10:
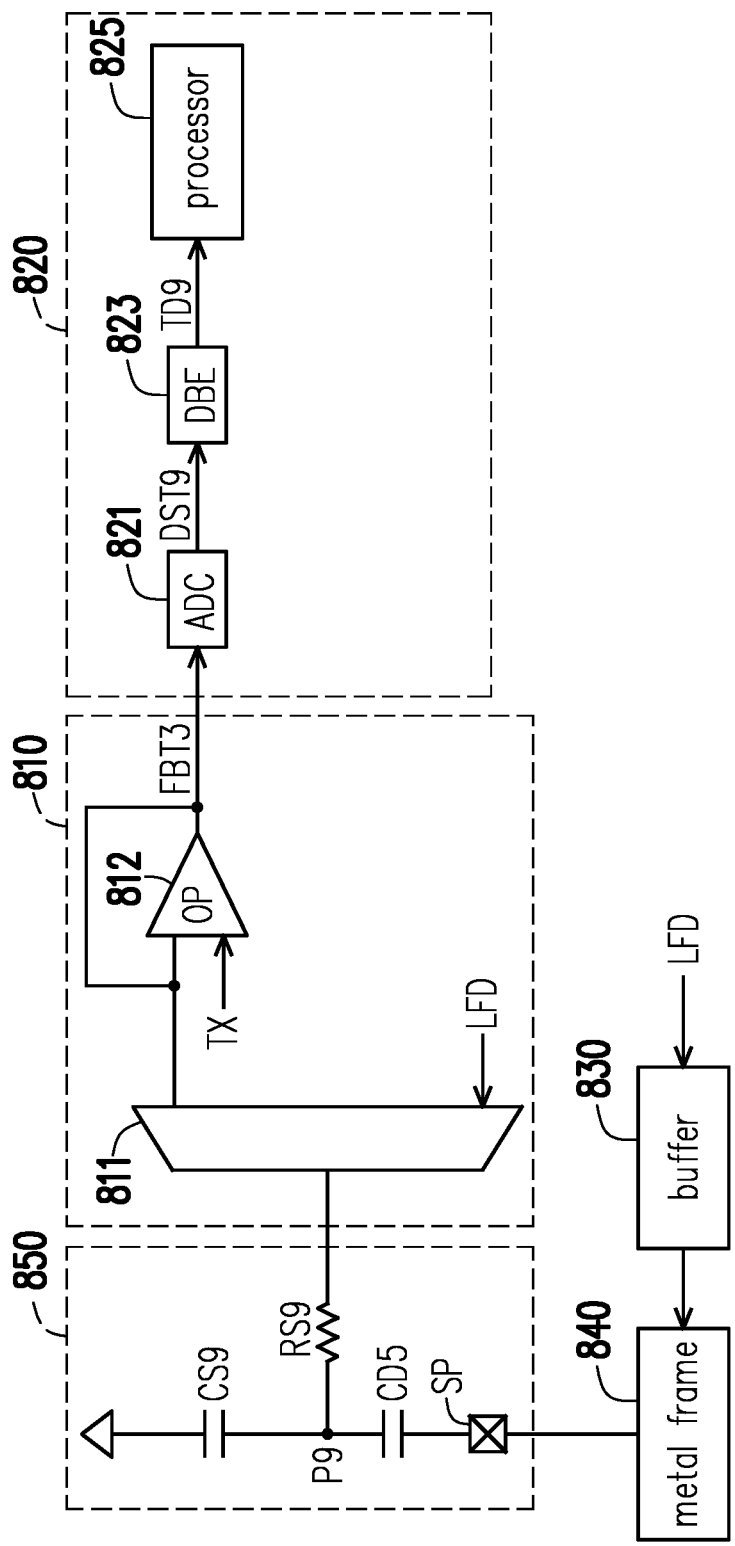
FIG. 10 is a circuit block diagram illustrating a touch detection circuit according to another embodiment of the invention.

Referring to FIG. 9 and FIG. 10, the touch detection circuit 30 includes a first detection circuit 810, a touch controller 820, a buffer 830 and a metal frame 840. The touch detection circuit 30 is coupled to a touch panel having a plurality of touch areas, for example, the touch panel 340 (layout scheme) having touch areas referring to FIG. 3A, and the touch panel 340 is coupled to a metal frame 840. The metal frame 840 surrounds the touch panel 340 of a smart watch (not drawn). The first detection circuit 810 and the buffer 830 are coupled to the touch controller 820, and the metal frame 840 is coupled to buffer 830.

The touch controller 820 provides a touch detection signal TX and a load free driving signal LFD to the first detection circuit 810. The first detection circuit 810 transmits the touch detection signal TX and the load free driving signal LFD to the upper part and lower part touch of the touch panel 340 by turns, and the touch detection circuit 30 performs the touch detection on the touch areas of the touch panel sequentially by means of the touch detection signal TX and the load free driving signal LFD. In this embodiment, the sequence of touch detection is performed as just step S310 and step S320. In step S310, the upper part is touch detected (sensing) with the touch detection signal TX, and the load free driving signal LFD is applied to the lower part. In step S320, the lower part is touch detected (sensing) with the touch detection signal TX, and the load free driving signal LFD is applied to the upper part. The touch detection signal TX is a time-variant signal, but not limited.

In addition, the load free driving signal LFD is also applied to the buffer 830, and buffer 830 provides the buffered load free driving signal LFD to the metal frame 840 of the smart watch. And the buffered load free driving signal is provided to a sensor pad SP of the touch panel 850 (equivalent circuit) through the metal frame 840 of the smart watch.

The touch panel 850 (equivalent circuit) includes equivalent resistors RS9 and equivalent capacitors CD5, CS9. It is noted that the equivalent resistors RS9 and the equivalent capacitors CD5, CS9 are merely equivalent devices, rather than real devices. The equivalent capacitor CD5 between the node P9 and the sensor pad SP stands for the equivalent capacitor between the detected position and the metal frame.

Referring to FIG. 10, the first detection circuit 810 includes a first multiplexer 811, a first operation amplifier 812. The first multiplexer 811 is coupled to the touch panel 850 (equivalent circuit), selects one of the touch detection signal TX and the load free driving signal LFD, and transmits the selected one to the node P9 of the touch panel 850 according to a control signal (not drawn) from the touch controller 820.

A first input terminal of the first operation amplifier 812 is coupled to the first multiplexer 811, a second input terminal of the first operation amplifier 812 receives the touch detection signal TX, and an output terminal of the first operation amplifier 812 is coupled to the first input terminal of the first operation amplifier 812.

In addition, the first multiplexer 811 transmits the touch detection signal TX to touch areas which are touch detected to receive a feedback signal FBT3 of the touch detection signal TX, and transmits the low free driving signal LFD to touch areas which are not touch detected. Giving the step S310 as an example, the first multiplexer 111 transmits the touch detection signal TX to upper part of the touch panel 340 to receive a feedback signal FBT3 from the upper part of the touch panel 340, and transmits the low free driving signal LFD to the lower part of the touch panel 340.

Referring to FIG. 10, the touch controller 820 includes analog-to-digital convertor 821, digital back-end circuit 823, and a processor 825. The analog-to-digital convertor 821 is coupled to the first detection circuit 810. The analog-to-digital convertor 821 converts the feedback signals FBT3 of the touch detection signal TX to a touch digital signal DST9.

The digital back-end circuit 823 is coupled to the analog-to-digital convertor 821. The digital back-end circuits 823 performs a digital signal processing on the touch digital signal DST9 to generate touch data TD9. It is noted that the digital signal processing includes digital filtering to reduce noise, but not limited.

The processor 820 is coupled to the digital back-end circuit 823, and the processor 820 receives the touch data TD9 to perform a normal touch computing.

In this embodiment, since the buffered load free driving signal LFD in phase with the touch detection signal TX is applied to sensor pad SP, the equivalent capacitors CD5 between the node P9 and the sensor pad SP standing for the equivalent capacitor between the detected position and the metal frame should be ignored. That is, whether the water contacts the metal frame of the smart watch or not, the touch data TD9 would not be affected. It shows a benefit of reducing the touch detection error caused by water without additional front-end and back-end circuits, and saving computing resource.

Based on the above, in the embodiments of the invention, in order to cope with the touch detection error caused by water touching the metal frame of the smart watch, the embodiments of the invention provide a touch detection circuit with a touch detection method which detects the water based on the capacitance variation between the boundary areas and the corresponding central area of the touch panel, so as to improve the reliability of touch detection of smart watch without affecting the normal touch detection to user's finger even water contacts the metal frame of the smart watch. In another embodiment, whether the water contacts the metal frame or not would be ignored by providing a low free driving signal to a sensor pad of touch panel through the metal frame, so as to improve the reliability of touch detection with saving the layout area and computing resource.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch detection circuit, coupled to a touch panel having a plurality of touch areas, wherein the touch areas comprise a plurality of boundary areas, comprising:
    a first detection circuit, configured to select one of a first signal and a second signal as a first detection signal and transmit the first detection signal to one of the boundary areas of the touch areas which are not touch detected to receive a first feedback signal; and
    a second detection circuit, configured to select the other one of the first signal and the second signal as a second detection signal and transmit the second detection signal to a corresponding central area of the touch areas which are not touch detected to receive a second feedback signal, wherein the corresponding central area comprises touch areas which are not touch detected except the one of the boundary areas.

2. A touch detection circuit as claimed in claim 1, wherein the touch detection circuit further comprises a touch controller coupled to the first detection circuit and the second detection circuit, wherein the touch controller selects one of the boundary areas of touch areas which are not touch detected, and compares the first feedback signal with the second feedback signal to generate a capacitance variation between the selected boundary area and the corresponding central area.

3. A touch detection circuit as claimed in claim 2, wherein the touch controller comprises:
    a plurality of analog-to-digital convertors, respectively coupled to the first detection circuit and the second detection circuit, configured to convert the first feedback signal and the second feedback signal to a first digital signal and a second digital signal, and to convert a feedback signal of a touch detection signal to a touch digital signal;
    a plurality of digital back-end circuits, respectively coupled to the plurality of analog-to-digital convertors, configured to perform a digital signal processing on the first digital signal and the second digital signal to generate a first capacitance data and a second capacitance data, and to perform the digital signal processing on the touch digital signal to generate a plurality of touch data; and
    a processor, coupled to the plurality of digital back-end circuits, configured to compute a difference between the first capacitance data and the second capacitance data to generate the capacitance variation between the selected boundary area and the corresponding central area.

4. A touch detection circuit as claimed in claim 2, wherein the first detection circuit comprises:

a first multiplexer, coupled to the touch panel, configured to select and transmit one of the touch detection signal, the first signal and the second signal to the touch panel;
a first operation amplifier, a first input terminal of the first operation amplifier coupled to the first multiplexer, a second input terminal of the first operation amplifier receiving the touch detection signal, and an output terminal of the first operation amplifier coupled to the first input terminal of the first operation amplifier; and
a second operation amplifier, a first input terminal of the second operation amplifier coupled to the first multiplexer, a second input terminal of the second operation amplifier receiving the first signal, and an output terminal of the second operation amplifier coupled to the first input terminal of the second operation amplifier,
wherein the first multiplexer transmits the touch detection signal to touch areas which are touch detected to receive a feedback signal of the touch detection signal, and transmits the first detection signal to the selected boundary area of the touch areas which are not touch detected to receive the first feedback signal.

5. A touch detection circuit as claimed in claim 2, wherein the second detection circuit comprises:
a second multiplexer, coupled to the touch panel, configured to select and transmit one of the touch detection signal, the first signal and the second signal to the touch panel;
a third operation amplifier, a first input terminal of the third operation amplifier coupled to the second multiplexer, a second input terminal of the third operation amplifier receiving the touch detection signal, and an output terminal of the third operation amplifier coupled to the first input terminal of the third operation amplifier; and
a fourth operation amplifier, a first input terminal of the fourth operation amplifier coupled to the second multiplexer, a second input terminal of the fourth operation amplifier receiving the first signal, and an output terminal of the fourth operation amplifier coupled to the first input terminal of the fourth operation amplifier
wherein the second multiplexer transmits the touch detection signal to touch areas which are touch detected to receive a feedback signal of the touch detection signal, and transmits the second detection signal to the corresponding central area to receive the second feedback signal.

6. A touch detection circuit as claimed in claim 1, wherein the first signal is a DC voltage signal, and the second signal is a load free driving signal in phase with a touch detection signal.

7. A touch detection circuit as claimed in claim 1, wherein the first signal is a touch detection signal, and the second signal is an inverse touch detection signal.

8. A touch detection method, adapted to a touch detection circuit coupled to a touch panel having a plurality of touch areas, wherein the touch detection circuit comprises a first detection circuit and a second detection circuit and the touch areas comprise a plurality of boundary areas, comprising:
selecting, by the first detection circuit, one of a first signal and a second signal as a first detection signal;
transmitting, by the first detection circuit, the first detection signal to one of the boundary areas of the touch areas which are not touch detected to receive a first feedback signal;
selecting, by the second detection circuit, the other one of the first signal and the second signal as a second detection signal; and transmitting, by the second detection circuit, the second detection signal to a corresponding central area of the touch areas which are not touch detected to receive a second feedback signal,
wherein the corresponding central area comprises touch areas which are not touch detected except the one of the boundary areas.

9. A touch detection method as claimed in claim 8, further comprising:
selecting one of the boundary areas of the touch areas which are not touch detected; and
comparing the first feedback signal with the second feedback signal to generate a capacitance variation between the selected boundary area and the corresponding central area.

10. A touch detection method as claimed in claim 9, further comprising:
converting the first feedback signal and the second feedback signal to a first digital signal and a second digital signal;
performing a digital signal processing on the first digital signal and the second digital signal to generate a first capacitance data and a second capacitance data; and
computing a difference between the first capacitance data and the second capacitance data to generate the capacitance variation between the selected boundary area and the corresponding central area.

11. A touch detection method as claimed in claim 9, further comprising:
transmitting a touch detection signal to touch areas which are touch detected to receive a feedback signal of the touch detection signal, transmitting the first detection signal to the selected boundary area of the touch areas which are not touch detected to receive the first feedback signal, and transmitting the second detection signal to the corresponding central area to receive the second feedback signal.

12. A touch detection circuit, coupled to a touch panel having a plurality of touch areas, wherein the touch areas comprise a plurality of boundary areas, comprising:
a plurality of first detection circuits, each of the first detection circuits configured to select one of a first signal and a second signal as one of a plurality first detection signals and transmit the one of first detection signals to one of the boundary areas of the touch areas which are not touch detected to receive one of a plurality of first feedback signals;
a plurality of second detection circuits, each of the second detection circuits configured to select the other one of the first signal and the second signal as one of a plurality of second detection signals and transmit the one of second detection signals to a corresponding central area of the touch areas which are not touch detected to receive one of a plurality of second feedback signals, wherein the corresponding central area comprises touch areas which are not touch detected except the boundary areas; and
a third detection circuit, coupled to the first detection circuits and the second detection circuits,
wherein the first detection circuits and the second detection circuits receive the first signal from the third detection circuit.

13. A touch detection circuit as claimed in claim 12, wherein the touch detection circuit further comprises a touch controller coupled to the first detection circuit, the second detection circuit and the third detection circuit, wherein the touch controller performs a touch detection on the touch areas by means of a plurality of touch detection signals, compares the first feedback signals with the second feedback signals to generate a total capacitance variation between the boundary areas and the corresponding central areas.

14. A touch detection circuit as claimed in claim 13, wherein the touch controller comprises:
   a plurality of first analog-to-digital convertors, respectively coupled to the first detection circuits and the second detection circuits, configured to convert a plurality of feedback signals of the touch detection signals to a plurality of touch digital signals;
   a plurality of first digital back-end circuits, respectively coupled to the first analog-to-digital convertors, configured to perform a digital signal processing on the touch digital signals to generate a plurality of touch data;
   a second analog-to-digital convertor, coupled to the third detection circuit, configured to convert the first feedback signals and the second feedback signals to a plurality of first digital signals and a plurality of second digital signals;
   a second digital back-end circuit, coupled to second analog-to-digital convertor, configured to perform a digital signal processing on the first digital signals and the second digital signals to generate a plurality of first capacitance data and a plurality of second capacitance data; and
   a processor, coupled to the second digital back-end circuit, configured to compute a difference between a sum of the plurality of first capacitance data and a sum of the plurality of second capacitance data to generate the total capacitance variation between the boundary areas and the corresponding central areas.

15. A touch detection circuit as claimed in claim 13, wherein the first detection circuits comprises:
   a plurality of first multiplexer, coupled to the touch panel, each of the first multiplexers configured to select and transmit one of the touch detection signals, the first signal and the second signal to the touch panel;
   a plurality of first operation amplifier, a first input terminal of each of the first operation amplifiers coupled to a corresponding first multiplexer, a second input terminal of each of the first operation amplifiers receiving one of the touch detection signals, and an output terminal of each of the first operation amplifiers coupled to the first input terminal of each of the first operation amplifiers; and
   wherein the first multiplexers transmit the touch detection signals to touch areas which are touch detected to receive a plurality of feedback signals of the touch detection signals, and transmit the first detection signals to the boundary areas to receive the first feedback signals.

16. A touch detection circuit as claimed in claim 13, wherein the second detection circuits comprises:
   a plurality of second multiplexer, coupled to the touch panel, each of the second multiplexers configured to select and transmit one of the touch detection signals, the first signal and the second signal to the touch panel;
   a plurality of second operation amplifier, a first input terminal of each of the second operation amplifiers coupled to a corresponding second multiplexer, a second input terminal of each of the second operation amplifiers receiving one of the touch detection signals, and an output terminal of each of the second operation amplifiers coupled to the first input terminal of each of the second operation amplifiers; and
   wherein the second multiplexers transmit the touch detection signals to the touch areas which are touch detected to receive a plurality of feedback signals of the touch detection signals, and transmit the second detection signals to the corresponding central areas to receive the second feedback signals.

17. A touch detection circuit as claimed in claim 13, wherein the third detection circuit comprises:
   a third multiplexer, coupled to the first detection circuits and the second detection circuits, configured to receive the first feedback signals and the second feedback signals;
   a third operation amplifier, a first input terminal of the third operation amplifier coupled to the third multiplexer, a second input terminal of the third operation amplifier receiving the first signal, and an output terminal of the third operation amplifier coupled to the first input terminal of the third operation amplifier,
   wherein the third multiplexer transmits the first signal to the first detection circuits to receive the first feedback signals from the first detection circuits, and transmits the first signal to the second detection circuits to receive the second feedback signals from the second detection circuits.

18. A touch detection circuit as claimed in claim 12, wherein the first signal is a DC voltage signal, and the second signal is a load free driving signal in phase with a touch detection signal.

19. A touch detection circuit as claimed in claim 12, wherein the first signal is a touch detection signal, and the second detection signal is an inverse touch detection signal.

20. A touch detection method, adapted to a touch detection circuit coupled to a touch panel having a plurality of touch areas, wherein the touch detection circuit comprises a plurality of first detection circuits, a plurality of second detection circuits and a third detection circuit and the touch areas comprise a plurality of boundary areas, comprising:
   selecting, by each of the first detection circuits, one of a first signal and a second signal as one of a plurality of first detection signals;
   transmitting, by each of the first detection circuits, the one of the first detection signals to one of the boundary areas of the touch areas which are not touch detected to receive one of a plurality of first feedback signals;
   selecting, by each of the second detection circuits, the other one of the first signal and the second signal as one of a plurality of second detection signals; and
   transmitting, by each of the second detection circuits, the one of second detection signals to a corresponding central area of the touch areas which are not touch detected to receive one of a plurality of second feedback signals, wherein the corresponding central area comprises touch areas which are not touch detected except the boundary areas
   wherein the first signal is received from the third detection circuit.

21. A touch detection method as claimed in claim 20, further comprising:
   performing a touch detection on the touch areas by means of a plurality of touch detection signals; and
   comparing the first feedback signals with the second feedback signals to generate a total capacitance variation between the boundary areas and the corresponding central areas.

22. A touch detection method as claimed in claim 21, further comprising:

converting the first feedback signals and the second feedback signals to a plurality of first digital signals and a plurality of second digital signals;

performing a digital signal processing on the first digital signals and the second digital signals to generate a plurality of first capacitance data and a plurality of second capacitance data; and computing a difference between a sum of the plurality of first capacitance data and a sum of the plurality of second capacitance data to generate the total capacitance variation between the boundary areas and the corresponding central areas.

23. A touch detection method as claimed in claim 21, further comprising:

transmitting the touch detection signals to touch areas which are touch detected to receive a plurality of feedback signals of the touch detection signals;

transmitting the first detection signals to the boundary areas to receive the first feedback signals; and transmitting the second detection signals to the corresponding central area to receive the second feedback signals.

\* \* \* \* \*